(12) United States Patent
Harada

(10) Patent No.: US 6,257,198 B1
(45) Date of Patent: Jul. 10, 2001

(54) COMBUSTION CONTROL APPARATUS AND COMBUSTION CONTROL METHOD FOR ENGINE

(75) Inventor: Jun Harada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/560,705

(22) Filed: Apr. 27, 2000

(30) Foreign Application Priority Data

Apr. 28, 1999 (JP) .................................................. 11-122784

(51) Int. Cl.$^7$ .............................. F02N 17/06; F02B 17/00
(52) U.S. Cl. ..................................... 123/295; 123/142.5 R
(58) Field of Search ..................... 123/142.5 E, 142.5 R, 123/295–305

(56) References Cited

U.S. PATENT DOCUMENTS

| | | | |
|---|---|---|---|
| 5,931,380 | * | 8/1999 | Aoki et al. ..................... 123/142.5 R |
| 6,044,642 | * | 4/2000 | Nishimura et al. .................. 123/295 |
| 6,155,230 | * | 12/2000 | Iwano et al. ..................... 123/339.16 |

FOREIGN PATENT DOCUMENTS

| | | |
|---|---|---|
| 8189405A | 7/1996 | (JP) . |
| 9303169A | 11/1997 | (JP) . |

\* cited by examiner

*Primary Examiner*—Erick Solis
(74) *Attorney, Agent, or Firm*—Kenyon & Kenyon

(57) ABSTRACT

An air-conditioning system heats the passenger compartment with coolant circulating in the water jacket of an engine. An electronic control unit of the engine controls the engine to perform homogeneous-charge combustion when the engine load is high and to perform stratified-charge combustion when the engine load is low. However, the ECU further controls the engine to perform the homogenous-charge combustion when the heating performance of the air-conditioning system is insufficient. This lowers the heat efficiency of the engine and increases heat transferred from combustion gas to the coolant. As a result, the heating performance of the air-conditioning system will be sufficient.

17 Claims, 10 Drawing Sheets

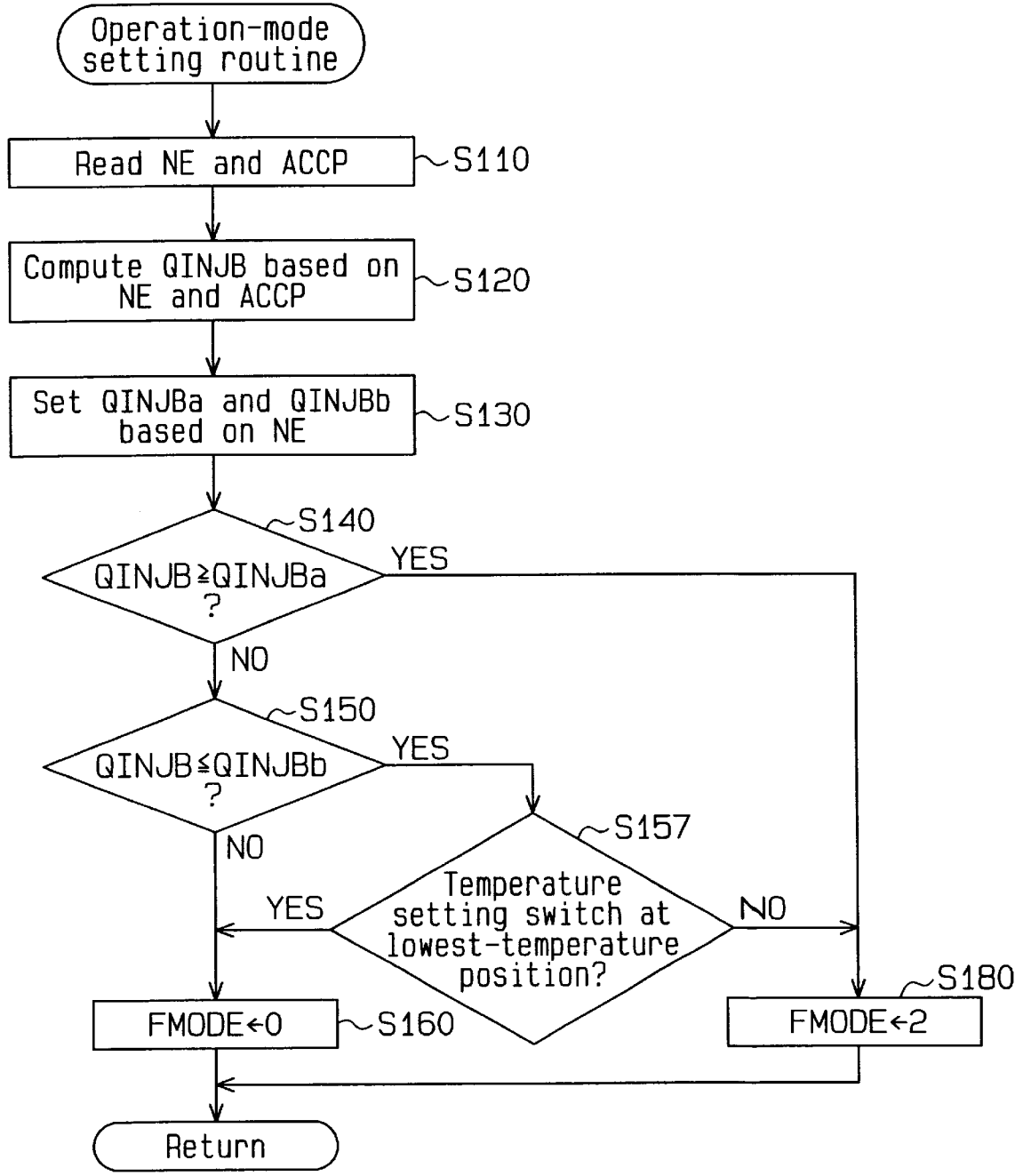

COMBUSTION CONTROL APPARATUS AND COMBUSTION CONTROL METHOD FOR ENGINE

BACKGROUND OF THE INVENTION

The present invention relates to an engine to be mounted in a vehicle equipped with a heater that uses engine coolant as a heating source, and, more particularly, to a combustion control apparatus and combustion control method for an engine that carries out stratified-charge combustion (stratified combustion).

An engine has been proposed that carries out stratified combustion, in which fuel is non-uniformly injected into the combustion chamber of the engine near the ignition plug, and homogeneous-charge combustion (homogeneous combustion), in which fuel is uniformly distributed in the combustion chamber (see Japanese Unexamined Patent Publication (KOKAI) No. Hei 8-189405, for example).

Generally, during the stratified combustion, the temperature of the combustion gas that contacts the inner wall of the combustion chamber is relatively low, thus reducing the amount of heat transferred to the engine coolant through the inner wall. This makes the cooling loss lower than that of homogeneous combustion. Since the air-fuel mixture is leaner during stratified combustion, the throttle valve is opened more widely, accordingly. This makes the pumping loss lower than that of homogeneous combustion.

Because of the reductions in cooling loss and pumping loss, stratified combustion reduces fuel consumption as much as possible while providing about the same engine power as that provided by the homogeneous combustion.

While an engine that carries out stratified combustion consumes less fuel, it raises the following significant problem when used in a vehicle equipped with a hot water heater for heating the interior of the vehicle.

Since the rate of heat transferred to the coolant is lower during stratified combustion, the temperature of the coolant also becomes lower than that of homogeneous combustion. Because the hot water heater uses this coolant as the heat source, the heat output may be inadequate.

In particular, if stratified combustion is performed in a low-engine-load mode, such as when idling, which relatively reduces the amount of fuel injection as described in the aforementioned Japanese publication, the amount of combustion heat generated in the combustion chamber is smaller. This further reduces the heat output of the heater.

SUMMARY OF THE INVENTION

Accordingly, it is an object of the present invention to provide a combustion control apparatus and combustion control method for an engine that improves the heating performance of a heater that uses the coolant of the engine as its heat source.

To achieve the foregoing and other objectives and in accordance with the purpose of the present invention, an apparatus for controlling an engine used in a vehicle is provided. The vehicle has a heater that uses engine coolant as a heating source. The engine operates in a stratified-charge-combustion mode, in which a mixture of air and fuel is non-uniformly injected into a combustion chamber. The apparatus includes determination means and a controller. The determination means determines whether the heating performance of the heater is insufficient. When the heating performance of the heater is determined to be insufficient, the controller controls the engine such that the engine heat efficiency falls below that of the stratified-charge-combustion mode.

The present invention may also be embodied in a method for controlling an engine used in a vehicle. The vehicle has a heater that uses engine coolant as a heating source. The engine operates in a stratified-charge-combustion mode, in which a mixture of air and fuel is non-uniformly injected into a combustion chamber. The method includes: determining whether the heating performance of the heater is insufficient; and controlling the engine such that the engine heat efficiency falls below that of the stratified-charge-combustion mode when the heating performance of the heater is determined to be insufficient.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 16 is a flowchart illustrating an operation-mode-setting routine according to a seventh embodiment.

DETAILED DESCRIPTION OF THE PREFERRED EMBODIMENTS

First Embodiment

A description will now be given of a first embodiment of this invention as adapted to an combustion control apparatus for an in-cylinder fuel injection type gasoline engine to be used in a vehicle.

Figure 1:
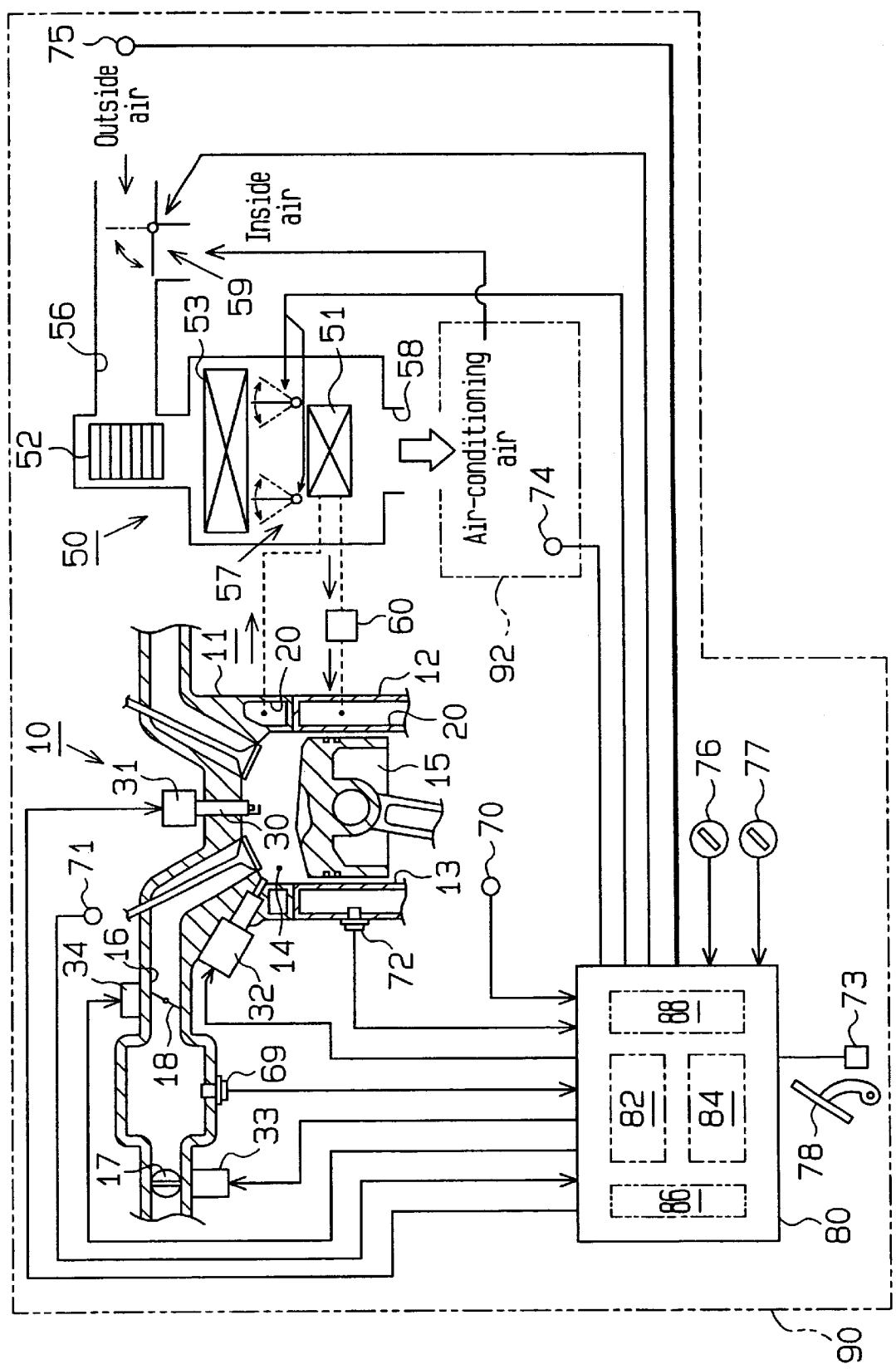
FIG. 1 is a schematic structural diagram of an engine and an air-conditioning system according to a first embodiment of the present invention.

FIG. 1 shows the schematic structure of an engine 10, a combustion control apparatus for the engine 10 and an air-conditioning system 50 installed in a vehicle 90. The engine 10 has a cylinder head 11 and a cylinder block 12. Formed in the cylinder block 12 are a plurality of cylinders 13 (one shown in FIG. 1) in which pistons 15 are located. Each piston 15, the associated cylinder 13 and the cylinder head 11 defines a combustion chamber 14.

A water jacket 20 is formed inside the cylinder head 11 and the cylinder block 12. A water pump 60 causes engine coolant to circulate in the water jacket 20, thereby cooling the cylinder head 11 and the cylinder block 12. While cooling the cylinder head 11 and cylinder block 12, the engine coolant absorbs heat so that its temperature rises accordingly.

Formed in the cylinder head 11 is an air-intake passage 16, which communicates with the combustion chamber 14. A throttle valve 17, which regulates the amount of intake air, is located in the air-intake passage 16. In the air-intake passage 16, downstream of the throttle valve 17, is a swirl control valve 18, which adjusts the strength of the swirl current that is formed by the intake air in the combustion chamber 14. The actuations of the throttle valve 17 and swirl control valve 18 are respectively controlled by a throttle motor 33 and a swirl motor 34. The angle of the throttle valve 17 (throttle angle TA) and the angle of the swirl control valve 18 (swirl angle) are set based on drive signals that are respectively input to the motors 33 and 34.

Injectors 32, which directly inject fuel into the associated combustion chambers 14, are provided on the cylinder head 11 in association with the individual cylinders 13. High-pressure fuel is supplied to the injectors 32 via delivery pipes (not shown). The amount of fuel injected and the fuel injection timing are set based on a drive signal input to each injector 32.

The cylinder head 11 is provided with ignition plugs 30, which ignite the air-fuel mixtures in the associated combustion chambers 14. Each ignition plug 30 is connected to an igniter 31, which incorporates an ignition coil (not shown). The ignition timing of each ignition plug 30 is set based on a drive signal input to the igniter 31.

The aforementioned throttle angle, swirl angle, injection amount, injection timing and ignition timing are controlled by an electronic control unit (ECU) 80. This ECU 80 includes an operation section 82, which performs arithmetic operations, a storage section 84, where various kinds of programs and data, which is used by the programs, are stored, an output section 86, which outputs drive signals to the motors 33 and 34, the injectors 32, the igniters 31, and other things, and an input section 88, to which signals from various sensors are input.

One of the sensors is an intake-air pressure sensor 69, which detects the pressure of the intake air (intake-air pressure PM).

A crank-angle sensor 70 and a cam-angle sensor 71 are respectively provided near the crank shaft and cam shaft (neither shown) of the engine 10. Based on detection signals from those sensors 70 and 71, the rotational speed of the crank shaft (engine speed NE) and the rotational phase of the crank shaft (crank angle CA) are detected.

The cylinder block 12 is provided with a coolant-temperature sensor 72, which detects the temperature of the engine coolant (coolant temperature THW). Provided in the vicinity of an acceleration pedal 78 is an acceleration sensor 73, which detects the position of the pedal 78 (acceleration angle ACCP).

Provided in a passenger compartment 92 is a temperature sensor 74, which detects the temperature inside the passenger compartment 92 (compartment temperature THC). An outside-air temperature sensor 75, which detects the temperature of the outside air (outside-air temperature THA), is provided on the vehicle such that it is exposed to the outside air.

The sensors 69 to 75 are connected to the input section 88 of the ECU 80 so that their detection signals are sent to the input section 88. Based on the detection signals from various sensors including the aforementioned sensors 69–75, the ECU 80 executes various kinds of controls, such as combustion control, which are associated with the engine 10.

For example, the combustion mode of the engine 10 is switched between homogenous combustion and stratified combustion under the combustion control that the ECU 80 performs.

When the combustion mode is switched to homogeneous combustion, fuel is injected during the suction stroke. The injected fuel is therefore uniformly distributed in the combustion chamber 14 until the time of ignition, and combustion takes place while the fuel concentration of the air-fuel mixture is approximately the same everywhere in the combustion chamber 14. The air-fuel ratio of the air-fuel mixture is set the stoichiometric air-fuel ratio (A/F=14.7).

When the combustion mode is switched to stratified combustion, fuel is injected during the compression stroke. The injected fuel is therefore non-uniformly distributed in the combustion chamber 14 at the time of ignition. The fuel is concentrated in the vicinity of the ignition plug 30, and combustion takes place while a layer of air-fuel mixture having a high fuel concentration is near the ignition plug 30. The air-fuel ratio of the air-fuel mixture (the average air-fuel ratio in the combustion chamber 14) is made lean (A/F=23 to 50) and is higher than the stoichiometric air-fuel ratio.

With the engine power taken as constant, the air-fuel ratios A/F(n) of the air-fuel mixture, the throttle angles TA(n), the injection timings AINJ(n), the fuel injection amounts (final injection amounts) QINJF(n) actually injected in the combustion chamber 14, the pumping losses LP(n), the cooling losses LC(n) (n=0 or 2: n=0 indicates the stratified-charge-combustion mode (stratified mode) and n=2 indicates the homogeneous-charge-combustion mode (homogeneous mode)) in the homogeneous mode and the stratified mode satisfy relationships given by the following equations 1a to 6a. The greater the injection timing AINJ(n) is, the further advanced the timing is.

$$A/F(0) > A/F(2) \tag{1a}$$

$$TA(0) > TA(2) \tag{2a}$$

$$AINJ(0) < AINJ(2) \tag{3a}$$

$$QINJF(0) < QINJF(2) \tag{4a}$$

$$LP(0) < LP(2) \tag{5a}$$

$$LC(0) < LC(2) \tag{6a}$$

As apparent from the equations 5a and 6a, the pumping loss and the cooling loss in homogeneous combustion are greater than those in stratified combustion, and the engine heat efficiency in homogeneous combustion is lower than that in stratified combustion.

The structure and operation of the air-conditioning system 50 is described below.

This air-conditioning system 50 regulates the temperature inside the passenger compartment 92 to a predetermined temperature and includes a heater core 51, an evaporator 53 and a blower fan 52.

The heater core 51, which heats air that flows into the air-conditioning system 50, includes a plurality of pipes (not shown) having heating fins (not shown). Inside the pipes is a circulation passage where the engine coolant circulates. The inlet (not shown) of the circulation passage is connected to the water jacket 20 of the cylinder head 11, and the outlet (not shown) of the circulation passage is connected to the water jacket 20 of the cylinder block 12 via the water pump 60. Therefore, the engine coolant that is pumped from the water pump 60 enters the circulation passage via the cylinder block 12 and the cylinder head 11 and returns to the water pump 60 from this passage.

The evaporator 53, which cools air that flows into the air-conditioning system 50, includes a plurality of pipes (not shown) having cooling fins (not shown). Inside the pipes is a circulation passage where the coolant circulates.

The blower fan 52 causes outside air or inside air (the air in the passenger compartment 92) to enter the air-conditioning system 50 via a blow-in passage 56 and forces the temperature-regulated outside air or inside air into the passenger compartment 92 as conditioned-air from a blow-out port 58.

Provided in the blow-in passage 56 is an inside/outside air switching damper 59, which switches between the states of letting outside air in and of letting the inside air in according to the position of the damper 59. The position of this damper 59 is controlled by the ECU 80 based on the position of an inside/outside air select switch 77.

The air (the outside air or inside air) that flows into the air-conditioning system 50 by the action of the blower fan 52 passes near the individual pipes of the evaporator 53. At this time, the cooling fins absorb the heat from the air, thus cooling the air. Part of the air that passes near the individual pipes of the evaporator 53 further passes near the individual pipes of the heater core 51. Since heat is transmitted to the air from the heating fins, the temperature of the air rises. The amount of the rise in temperature varies in accordance with the coolant temperature THW and increases as the coolant temperature THW increases.

Between the heater core 51 and the evaporator 53 is a temperature regulating damper 57, which regulates the amount of the air that passes through the heater core 51. The air that passes through the heater core 51, which is part of the air that has passed through the evaporator 53, in accordance with the position of the damper 57. The position of the damper 57 is controlled by the ECU 80 based on the position of a temperature setting switch 76.

When this temperature setting switch 76 is set to the lowest temperature, for example, the position of the temperature regulating damper 57 is adjusted to prevent air from passing through the heater core 51. As a result, the air that has been cooled by the evaporator 53 enters the passenger compartment 92 directly as the conditioned air. That is, when the temperature setting switch 76 set to the lowest temperature, the heater core 51 does not affect the temperature inside the passenger compartment 92.

As the position of the temperature setting switch 76 is set to a higher temperature side, the position of the temperature regulating damper 57 is changed to increase the amount of air that passes through the heater core 51. This increases the temperature of the conditioned air, thus increasing the rate of temperature increase inside the passenger compartment 92.

If the temperature of the engine coolant is low when raising the temperature inside the passenger compartment 92, the air-conditioning system 50 may not be able to produce enough heat. To avoid this, the amount of the heat transferred to the engine coolant from the combustion gas in the combustion chamber 14 is controlled by controlling the combustion state of the engine 10.

The details of the combustion control will now be described referring to FIGS. 2 to 4.

Figure 2:
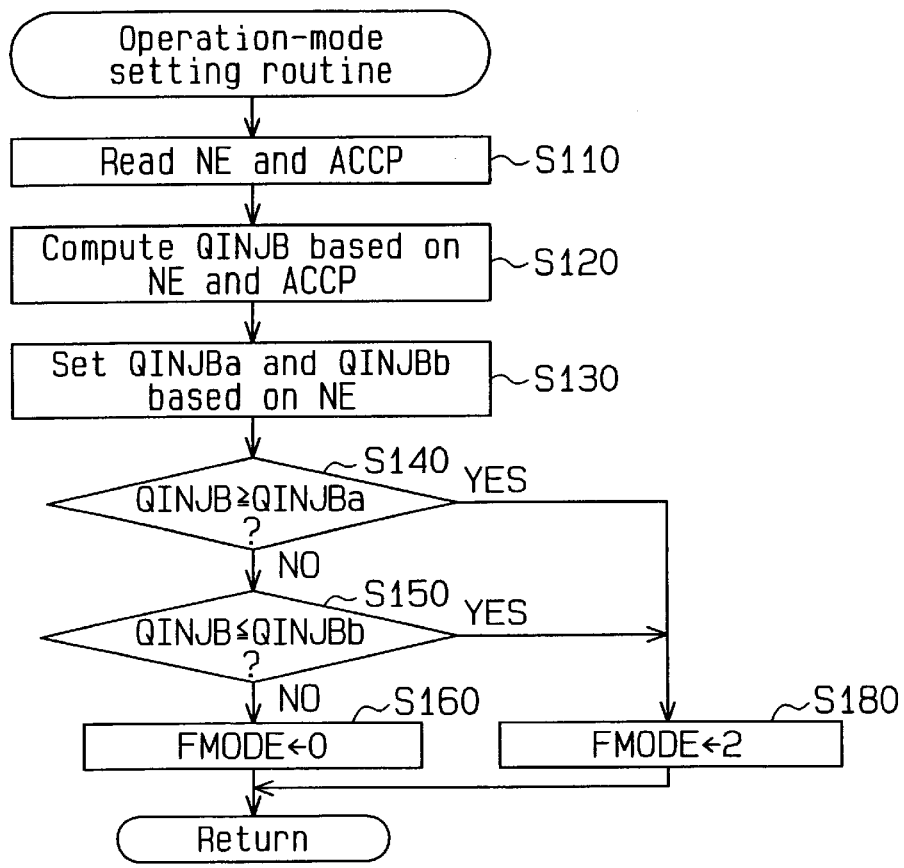
FIG. 2 is a flowchart illustrating an operation-mode-setting routine according to the first embodiment.

FIG. 2 is a flowchart illustrating a determination of whether the engine 10 should operate in the homogeneous mode or stratified mode. The sequence (operation-mode-setting routine) illustrated in this flowchart is repeatedly executed by the ECU 80 as an interruption routine every given crank angle CA.

In carrying out the operation-mode-setting routine, first, the engine speed NE and acceleration angle ACCP are read (step S110), and a basic injection amount QINJB is computed based on those two parameters (step S120). The basic injection amount QINJB is the amount of fuel that is required to provide the engine power according to the engine speed NE and acceleration angle ACCP when the operation mode is the stratified mode, and is equivalent to the load of the engine 10 (engine load).

Next, a first decision value QINJBa and second decision value QINJBb are set based on the engine speed NE (step S130). The decision values QINJBa and QINJBb are used to determine the operation mode.

The second decision value QINJBb, particularly, is the threshold level based on which it is determined whether or not the air-conditioning system 50 can deliver enough heat. When the basic injection amount QINJB is equal to or lower than the second decision value QINJBb, the amount of the combustion heat generated in the combustion chamber 14 is small and the amount of heat transferred to the engine coolant is small. In this case, it is determined that the air-conditioning system 50 cannot deliver an adequate amount of heat.

Operation data that defines the relationship among the engine speed NE and the decision values QINJBa and QINJBb is stored in the storage section 84 of the ECU 80, and the decision values QINJBa and QINJBb are set based on the operation data.

Figure 3:
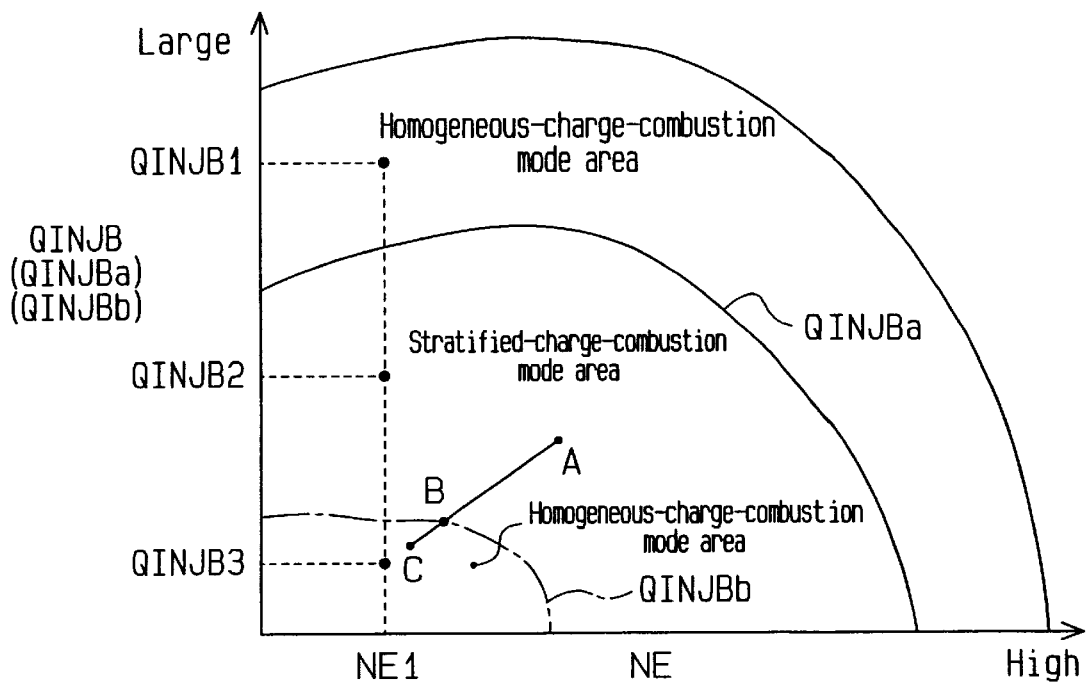
FIG. 3 is a map showing operation data to be used in setting first and second decision values.

FIG. 3 shows the operation data as a map. As shown in this diagram, given that the engine speed NE is constant, the decision values QINJBa and QINJBb always satisfy the relationship QINJBa(NE)>QINJBb(NE).

After the decision values QINJBa and QINJBb are set, the decision values QINJBa and QINJBb are compared with the basic injection amount QINJB (step S140 and step S150).

When it is determined that the basic injection amount QINJB is equal to or greater than the first decision value QINJBa (YES in step S140), the operation mode of the engine 10 is set to the homogeneous mode, and an operation-mode instruction value FMODE is set to two (step S180). The operation-mode instruction value FMODE is used in another routine to determine the individual control values for the engine 10 that match with the selected operation mode.

When it is determined that the basic injection amount QINJB is smaller than the first decision value QINJBa and is greater than the second decision value QINJBb (NO in step S140 and NO in step S150), the operation mode is set to the stratified mode and the operation-mode instruction value FMODE is set to zero (step S160).

When it is determined that the basic injection amount QINJB is equal to or smaller than the second decision value QINJBb (NO in step S140 and YES in step S150), it is determined that the air-conditioning system 50 cannot deliver an adequate amount of heat, and the operation mode is set to the homogeneous mode (step S180).

The comparison of the basic injection amount QINJB with the individual decision values QINJBa and QINJBb allows the operation mode of the engine 10 to be set to different modes in accordance with the basic injection amount QINJB, or the engine load, even if the engine speed NE is constant.

Even if the engine speed NE remains at a predetermined value NE1 as shown in FIG. 3, for example, the operation mode is set to the homogeneous mode when the basic injection amount QINJB is a predetermined value QINJB1 (QINJB1>QINJBa(NE1)), and the operation mode is set to the stratified mode when the basic injection amount QINJB is a predetermined value QINJB2 (QINJBb(NE1) <QINJB2<QINJBa(NE1)). Further, when the basic injection amount QINJB falls to a predetermined value QINJB3 (QINJB3<QINJBb(NE1)), the operation mode is set to the homogeneous mode.

When the operation mode of the engine 10 is set to either homogeneous combustion or stratified combustion in the above-described manner, this routine is temporarily terminated.

In a separate routine, the ECU 80 sets various control values for the engine 10 to suit the selected operation mode based on the operation-mode instruction value FMODE. At this time, the ECU 80 sets the various control values to assure predetermined engine power output according to the basic injection amount QINJB (engine load) regardless of the chosen operation mode (combustion mode). Therefore, a final injection amount QINJF in the homogeneous mode is always larger than that in the stratified mode, i.e., the basic injection amount QINJB.

As described above, the operation mode is set to the homogeneous mode in a high engine-load area, where the basic injection amount QINJB is large. While the operation mode is basically set to the stratified mode in a low engine-load area, where the basic injection amount QINJB is small, the operation mode is set again to the homogeneous mode when the basic injection amount QINJB becomes minimum, such as when idling.

Figure 4:
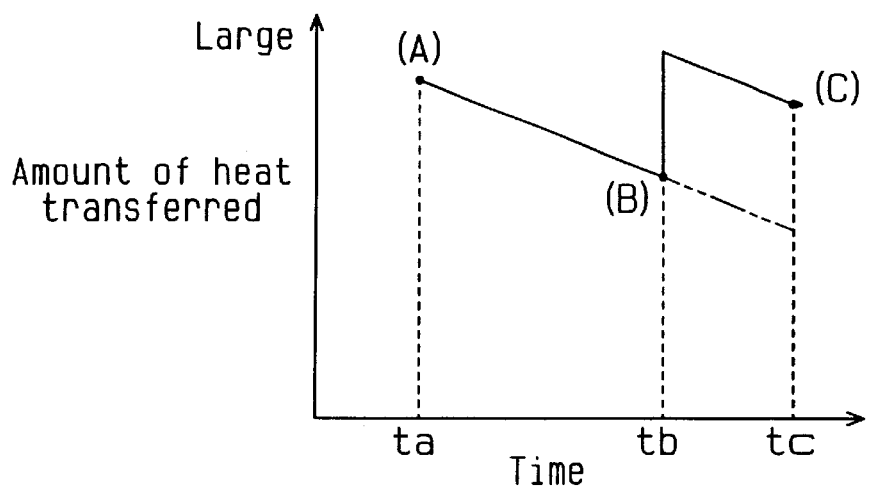
FIG. 4 is a timing chart illustrating a change in the amount of heat per unit time transferred to the engine coolant from the combustion gas.

FIG. 4 is a timing chart illustrating a change in the amount of heat per unit time that is transferred to the engine coolant from the combustion gas (the amount of transferred heat) when the engine's operation state (the engine speed NE and the basic injection amount QINJB) sequentially changes from the state of point A in FIG. 3 to the state of point C through the state of point B.

As illustrated in this diagram, in the period during which the engine's operation state changes from that of point A in FIG. 3 to that of point B (period from time ta to time tb), the amount of transferred heat gradually decreases as the amount of fuel injection decreases.

When the operation state is represented by point B (basic injection amount QINJB =second decision value QINJBb) and the operation mode is later switched to homogeneous combustion from stratified combustion (timing tb), the pumping loss and cooling loss increase and the engine's heat efficiency falls. This reduces the amount of combustion heat that is converted to engine power. Therefore, more fuel is needed in the homogenous mode than is required in the stratified mode, and the increased cooling loss increases the ratio of the combustion heat that is transferred to the engine coolant. As a result, the amount of transferred heat temporarily increases at timing tb.

In the period during which the operation state goes from point B in FIG. 3 to point C (the period from time tb to time tc), the amount of heat transferred decreases in accordance with a reduction in the amount of fuel injection, but the amount of heat transferred is always greater than that occurring when the operation state is set to the stratified mode (the amount of transmitted heat in this case is indicated by a long and short dashed line in FIG. 4). The temperature increase of the engine coolant is therefore accelerated to guarantee that the air-conditioning system 50 can produce an adequate amount of heat.

This embodiment has the following advantages.

(1) When it is determined that the air-conditioning system 50 cannot produce enough heat, the combustion mode is controlled so that the engine's heat efficiency becomes lower than that of the stratified mode. Therefore, more fuel is needed than is required in the stratified mode, and the amount of heat that is transferred to the engine coolant from the combustion gas in the combustion chamber 14 increases. This accelerates an increase in the temperature of the engine coolant, which allows the air-conditioning system 50 to deliver more heat.

(2) Since the operation mode is set to the homogeneous mode, the increased cooling loss raises the temperature of the combustion gas that contacts the inner wall of the combustion chamber 14 above that of the stratified mode. This transfers more combustion heat to the engine coolant. The air-conditioning system 50 can thus deliver an adequate amount of heat.

(3) Further, the engine load (the basic injection amount QINJB), which has a high correlation with the amount of heat transferred be transmitted to the engine coolant, is compared with a predetermined decision value (second decision value QINJBb). It is determined that the air-conditioning system 50 cannot deliver an adequate amount of heat when the engine load is equal to or smaller than the decision value.

Second Embodiment

The description of the second embodiment will focus mainly on the differences from the first embodiment. Although the operation mode is set to the stratified mode when it is determined that the air-conditioning system 50 cannot deliver an adequate amount of heat in the first embodiment, the operation mode is set to a semi-stratified combustion mode (semi-stratified mode) in the second embodiment to guarantee adequate heat delivery by the air-conditioning system 50.

To begin with, semi-stratified combustion will be discussed in comparison with stratified combustion and homogeneous combustion. When the combustion mode is switched to semi-stratified combustion, fuel is injected in the compression stroke, as in stratified combustion. The injected fuel is therefore non-uniformly distributed in the combustion chamber 14 and is concentrated in the vicinity of the ignition plug 30 at the time of ignition.

However, in semi-stratified combustion, the throttle angle TA is smaller and the fuel injection timing is more advanced than in stratified combustion. Therefore, the amount of intake air decreases and the fuel injected in the combustion chamber 14 is more dispersed.

As a result, the difference between the fuel concentration of the air-fuel mixture layer of near the ignition plug 30 and the air-fuel mixture layer at other locations in semi-stratified combustion is less than that of stratified combustion. In other words, there is less stratification in the semi-stratified mode than in the stratified mode.

With the engine power taken as constant, the air-fuel ratios A/F(n) of the air-fuel mixture, the throttle angles TA(n), the injection timings AINJ(n), the fuel injection amounts QINJF(n), the pumping losses LP(n), the cooling losses LC(n) (n=0, 1 or 2: n=0 indicates the stratified mode, n=1 indicates the semi-stratified mode and n=2 indicates the homogeneous mode) in the semi-stratified mode, the stratified mode and the homogeneous mode satisfy relationships given by the following equations 1b to 6b. The greater the injection timing AINJ(n) is, the more advanced the timing is.

$$A/F(0) > A/F(1) > A/F(2) \quad (1b)$$

$$TA(0) > TA(1) > TA(2) \quad (2b)$$

$$AINJ(0) < AINJ(1) < AINJ(2) \quad (3b)$$

$$QINJF(0) < QINJF(1) < QINJF(2) \quad (4b)$$

$$LP(0) < LP(1) < LP(2) \quad (5b)$$

$$LC(0) < LC(1) < LC(2) \quad (6b)$$

As apparent from the equations 5b and 6b, the pumping loss and the cooling loss in semi-stratified combustion are greater than those of stratified combustion but are less than those of homogeneous combustion. The engine heat efficiency in semi-stratified combustion is therefore lower than that of stratified combustion but greater than that of homogeneous combustion.

Figure 5:
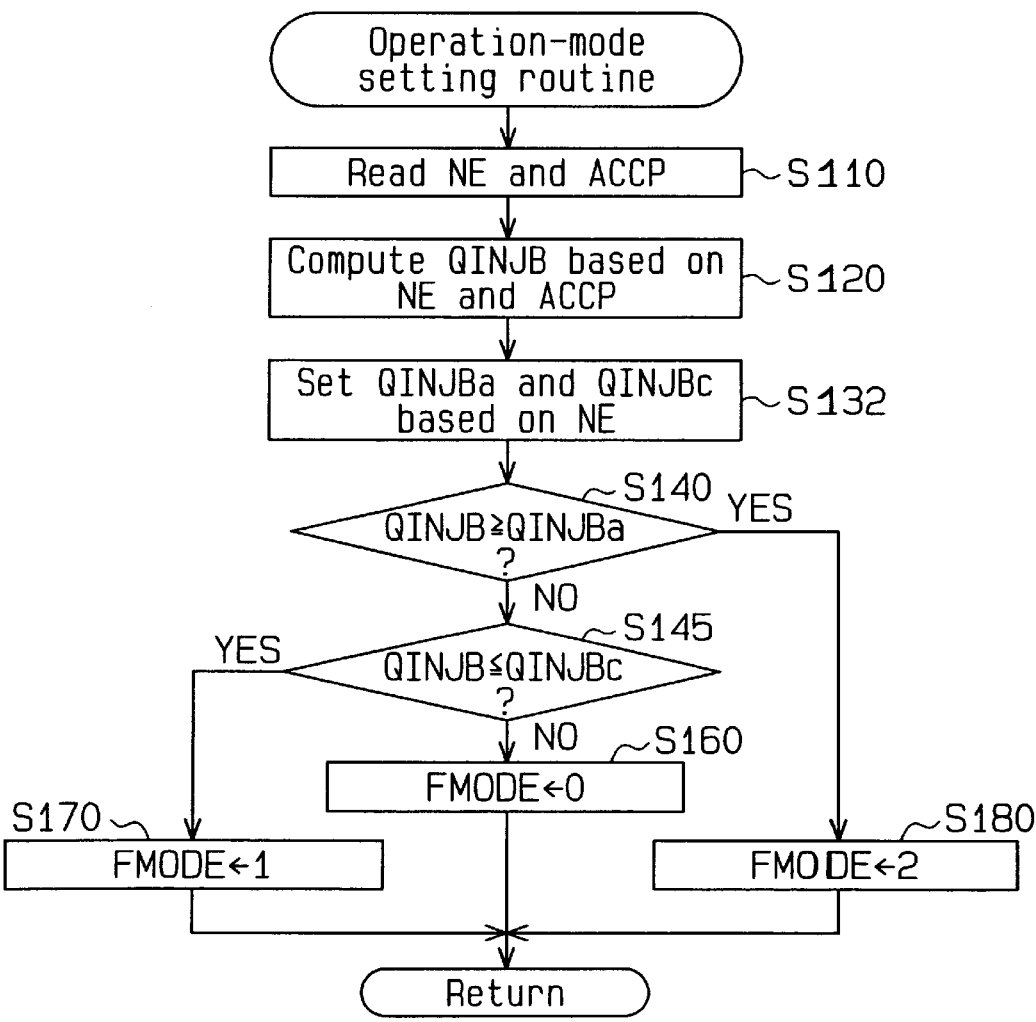
FIG. 5 is a flowchart illustrating an operation-mode-setting routine according to a second embodiment.

The details of the combustion control of this embodiment will now be described referring to FIGS. 5 to 7. FIG. 5 is a flowchart illustrating an operation-mode-setting routine according to this embodiment. Because the steps in the flowchart in FIG. 5 that have the same numerals as corresponding steps of the flowchart in FIG. 2 have discussed earlier, they will not be discussed again.

In carrying out this operation-mode-setting routine, first, the engine speed NE and acceleration angle ACCP are read and the basic injection amount QINJB is computed based on those parameters (steps S110 and S120). Then, the first decision value QINJBa and a third decision value QINJBc are set based on the engine speed NE (step S132).

The third decision value QINJBc is the threshold level based on which it is determined whether or not the air-conditioning system 50 can deliver an adequate amount of heat. When the basic injection amount QINJB is equal to or less than the third decision value QINJBc, the amount of combustion heat generated in the combustion chamber 14 is small, and the amount of heat transferred to the engine coolant is small. In this case, therefore, it is determined the air-conditioning system 50 cannot deliver an adequate amount heat.

Operation data that defines the relationship among the engine speed NE and the decision values QINJBa and QINJBc is stored in the storage section 84, and the decision values QINJBa and QINJBc are set based on the operation data.

Figure 7:
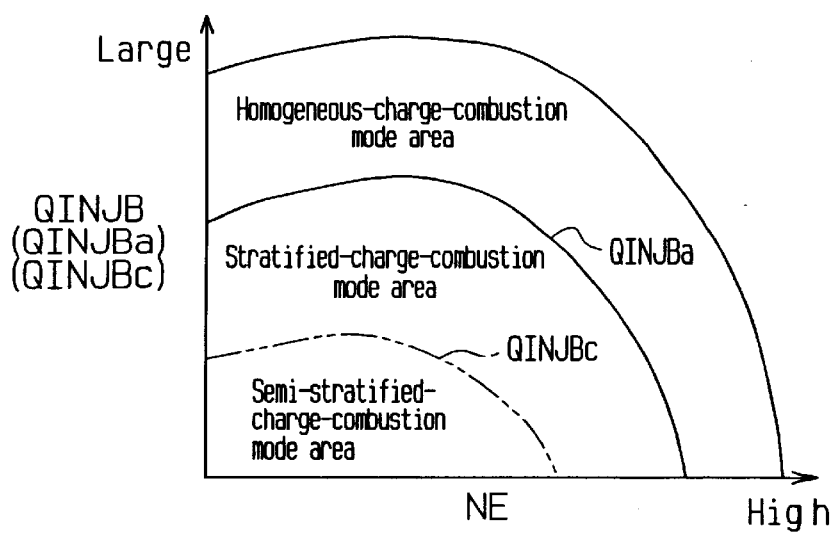
FIG. 7 is a map showing operation data to be used in setting a first decision value and third decision value.

FIG. 7 shows the operation data as a map. As shown in this diagram, given that the engine speed NE is constant, the decision values QINJBa and QINJBc always satisfy the relationship of QINJBa(NE)>QINJBc(NE).

Next, the first and third decision values QINJBa and QINJBc are compared with the basic injection amount QINJB (step S140 and step S145).

When it is determined that the basic injection amount QINJB is equal to or greater than the first decision value QINJBa (YES in step S140), the operation mode of the engine 10 is set to the homogeneous mode (FMODE=2) (step S180).

When it is determined that the basic injection amount QINJB is smaller than the first decision value QINJBa and is greater than the third decision value QINJBc (NO in step S140 and NO in step S145), the operation mode of the engine 10 is set to the stratified mode (FMODE=zero) (step S160).

When it is determined that the basic injection amount QINJB is equal to or smaller than the third decision value QINJBc (NO in step S140 and YES in step S145), it is determined that the air-conditioning system 50 cannot deliver an adequate amount heat, the operation mode of the engine 10 is set to the semi-stratified mode, and the operation-mode instruction value FMODE is set to one (step S170).

When the operation mode of the engine 10 is set to homogeneous combustion, stratified combustion or semi-stratified combustion in the above-described manner, this routine is temporarily terminated.

The ECU 80 sets various control values for the engine 10 based on the value of the operation-mode instruction value EMODE.

The detailed procedures of setting the control values will now be discussed referring to the flowchart shown in FIG. 6. The sequence illustrated in this flowchart is repeatedly executed by the ECU 80 as an interruption routine every given crank angle CA.

In setting the control values, first, it is determined whether the operation-mode instruction value FMODE is zero or one (step S210). In other words, it is determined whether stratified combustion (including the semi-stratified combustion) or homogeneous combustion is the current operation mode. When it is determined that the current operation mode is the homogeneous mode (NO in step S210), the individual control values for the engine 10 are set to suit the homogeneous mode (step S260). In the homogeneous mode, the intake-air pressure PM detected by the intake-air pressure sensor 69 is used to represent the engine load, and the individual control values are set based on the intake-air pressure PM and the engine speed NE. When the individual control values for the engine 10 in the homogeneous mode are set, this routine is temporarily terminated.

When it is determined that the current operation mode is the stratified mode or the semi-stratified combustion (YES in step S210), first, the throttle angle TA, the fuel injection timing AINJ, the final fuel injection amount QINJF (QINJF= basic injection amount QINJB), and other values, are computed based on the basic injection amount QINJB and the engine speed NE to suit stratified combustion (step S220).

Thereafter, it is determined whether the current operation mode is the semi-stratified mode (step S230). When the current operation mode is not the semi-stratified mode (NO in step S230), this routine is temporarily terminated.

When it is determined that the current operation mode is the semi-stratified mode (YES in step S230), on the other hand, correction amounts DTA, DAINJ and DQINJ for the throttle angle TA, the fuel injection timing AINJ and the final fuel injection amount QINJF, respectively, are computed. Based on the correction amounts DTA, DAINJ and DQINJ, the throttle angle TA, the fuel injection timing AINJ and the final fuel injection amount QINJF are corrected. Those control values TA, AINJ and QINJF are set to suit the semi-stratified mode (steps S240–S252).

First, a closing amount DTA of the throttle angle TA is computed based on the basic injection amount QINJB and the engine speed NE (step S240), and the current throttle angle TA for stratified combustion is reduced by the closing amount DTA (step S242).

An advancing amount DAINJ of the fuel injection timing AINJ is computed based on the closing amount DTA (step S244). When this computation is performed, the advancing amount DAINJ is increased as the closing amount DTA increases. The current fuel injection timing AINJ for the stratified mode is advanced by the advancing amount DAINJ (step S246).

The advancing amount DAINJ is calculated based on the closing amount DTA for the following reason. When the throttle angle TA is reduced based on the closing amount DTA, the amount of intake air decreases, which increases the concentration of the air-fuel mixture near the ignition plug 30. This may result in misfires. This tendency becomes more significant as the closing amount DTA increases.

Therefore, the time from fuel injection to ignition is increased by adjusting the fuel injection timing AINJ as the closing amount DTA increases. This increases the dispersion of injected fuel to prevent the concentration of the air-fuel mixture near the ignition plug 30 from becoming excessively high.

This correction of the throttle angle TA and the fuel injection timing AINJ based on the closing amount DTA and the advancing amount DAINJ closes the throttle valve 17 and increases the dispersion of injected fuel in the combustion chamber. This increases the pumping loss and cooling loss in the semi-stratified mode in comparison to the stratified mode. As a result, the engine power falls in accordance with a reduction in the engine's heat efficiency. Therefore, in the semi-stratified mode, more fuel is needed to produce the same engine power that is produced in the stratified mode.

An increase in the fuel injection amount DQINJ to compensate for the drop of the engine power is computed based on the closing amount DTA (step S250). The greater the closing amount DTA is, the lower the engine's heat efficiency becomes. The fuel-injection-amount increase DQINJ is therefore computed to be a large value. The basic injection amount QINJB is increased based on the fuel-injection-amount increase DQINJ, and the corrected injection amount is set as the final fuel injection amount QINJF in the semi-stratified mode (step S252), after which the routine is temporarily terminated.

As described above, according to the combustion control of this embodiment, the operation mode is changed to the semi-stratified mode, the stratification of which is less than that of the stratified mode, when it is determined that the air-conditioning system 50 cannot deliver adequate heat in the low-load operation area. Therefore, the engine's heat efficiency falls in accordance with an increase in the pumping loss and cooling loss. This requires more fuel to maintain the engine power according to the engine load (the basic injection amount QINJB). As a result, the amount of heat transferred to the engine coolant from the combustion gas in the combustion chamber 14 increases, which increases the temperature of the engine coolant.

Although the stratification in the semi-stratified mode is lower than that of the stratified mode, the temperature of the combustion gas that contacts the inner wall of the combustion chamber 14 is lower than that of the homogeneous mode, such that the cooling loss does not increase significantly.

As apparent from the above, this embodiment has the following advantage in addition to the advantages (1) and (3) of the first embodiment.

(4) An increase in fuel consumption is limited as much as possible while preventing the situation where the air-conditioning system 50 cannot deliver enough heat.

Third Embodiment

The description of the third embodiment will forces mainly on the differences from the second embodiment. According to this embodiment, when it is determined that the air-conditioning system 50 cannot deliver an adequate amount of heat, the operation mode is set to the semi-stratified mode or the homogeneous mode based on the heating performance.

The details of the combustion control of this embodiment will now be described referring to FIGS. 8 and 9.

Figure 8:
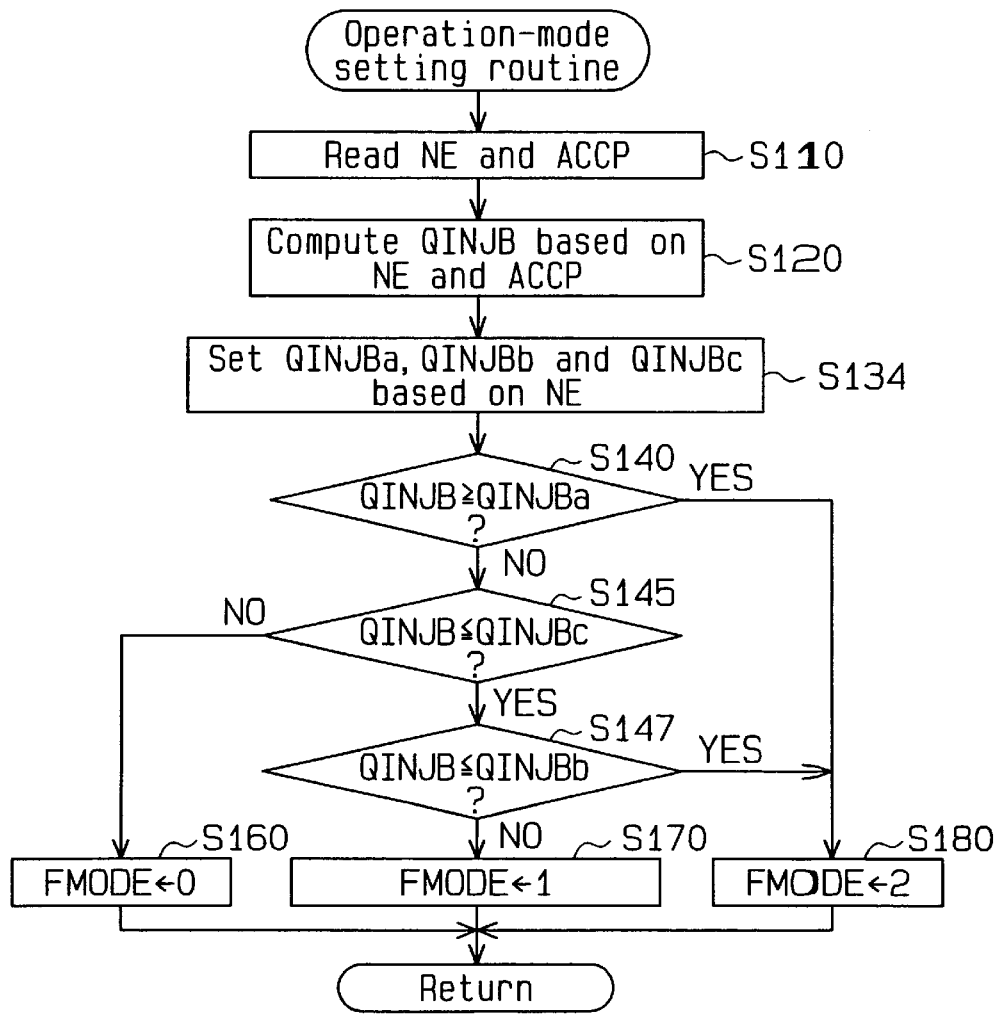
FIG. 8 is a flowchart illustrating an operation-mode-setting routine according to a third embodiment.

FIG. 8 is a flowchart illustrating the procedures of an operation-mode-setting routine according to this embodiment. The steps in the flowchart in FIG. 8 that have the same numerals as corresponding steps of the flowchart of FIG. 5 have been discussed earlier and will not be discussed again.

In carrying out this operation-mode-setting routine, first, the basic injection amount QINJB is computed based on the engine speed NE and acceleration angle ACCP (steps S110 and S120). Then, the first decision value QINJBa, the second decision value QINJBb and the third decision value QINJBc are set based on the engine speed NE (step S134). Of those parameters, the first and third decision values QINJBa and QINJBc are the same as those of the second embodiment.

The second decision value QINJBb is used to determine the heating performance of the air-conditioning system 50. As the engine load (basic injection amount QINJB) decreases, the amount of combustion heat generated in the combustion chamber 14 decreases, thus reducing the heat transfer to the engine coolant. When the basic injection amount QINJB is equal to or less than the second decision value QINJBb, therefore, it is determined that the heating performance of the air-conditioning system 50 is relatively low. When the basic injection amount QINJB is greater than the second decision value QINJBb, it is determined that the heating performance of the air-conditioning system 50 is relatively high.

Figure 9:
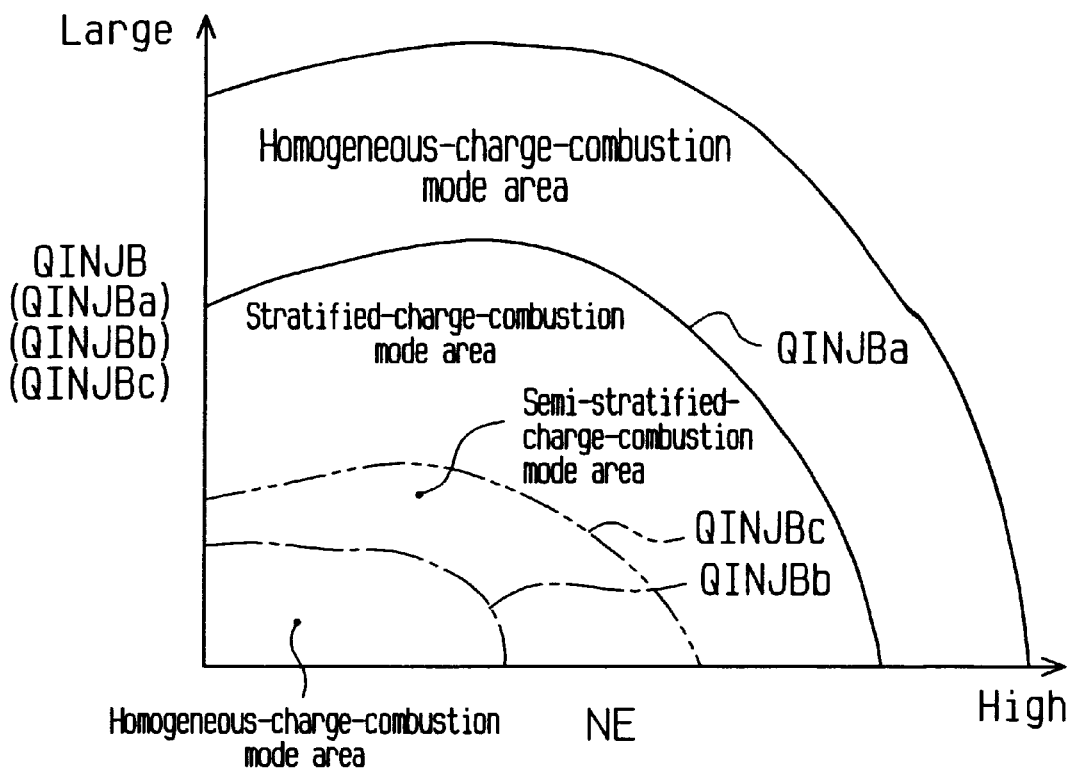
FIG. 9 is a map showing operation data to be used in setting first to third decision values.

FIG. 9 shows the map of individual operation data representing the relationship among the engine speed NE and the individual decision values QINJBa, QINJBb and QINJBc. As shown in this diagram, when the engine speed NE is constant, the decision values QINJBa, QINJBb and QINJBc always satisfy the relationship of QINJBa(NE)>QINJBc(NE)>QINJBb(NE).

Next, the first through third decision values QINJBa, QINJBb and QINJBc are compared with the basic injection amount QINJB (step S140, step S145 and step S147).

When it is determined that the basic injection amount QINJB is equal to or smaller than the third decision value QINJBc (NO in step S140 and YES in step S145), the basic injection amount QINJB is further compared with the second decision value QINJBb (step S147). When it is determined that the basic injection amount QINJB is larger than the second decision value QINJBb (NO in step S147), the operation mode of the engine 10 is set to the semi-stratified mode, and the operation-mode instruction value FMODE is set to one (step S170).

When it is determined that the basic injection amount QINJB is equal to or less than the second decision value QINJBb (YES in step S147), the heating performance of the air-conditioning system 50 is relatively low and is insufficient. The operation mode of the engine 10 is therefore set to the homogeneous mode and the operation-mode instruction value FMODE is set to two (step S180).

In the combustion control of this embodiment, when it is determined that the air-conditioning system 50 has a weak heating performance in the engine's low-load operation area, the operation mode is set to the semi-stratified mode or the homogeneous mode. When it is determined that the heating performance of the air-conditioning system 50 is relatively low, the operation mode is set to the homogeneous mode, which provides the lowest engine heat efficiency.

When the heating performance of the air-conditioning system 50 is relatively low, therefore, the temperature of the engine coolant rises quickly, which quickly improves heating performance. When the heating performance of the air-conditioning system 50 is relatively high, on the other hand, a reduction in the engine's heat efficiency is limited, which limits an increase in the fuel consumption.

As apparent from the above, this embodiment has the following advantages in addition to the advantages (1) and (3) of the first embodiment.

(5) The degree of reduction in the engine heat efficiency is adequately set in accordance with the heating performance of the air-conditioning system 50. This provides reliable heating performance limiting fuel consumption.

(6) Because the degree of the heating performance of the air-conditioning system 50 is determined based on the engine load (basic injection amount QINJB), which has a high correlation with the heating performance, it is possible to adequately estimate the degree of the heating performance.

Fourth Embodiment

The description of the fourth embodiment will focus mainly on the differences from the first embodiment. Although the second decision value QINJBb is set based only on the engine speed NE in the first embodiment, the second decision value QINJBb is set based on the engine speed NE and the coolant temperature THW in this embodiment.

The details of the combustion control of this embodiment will now be described referring to FIGS. 10 and 11 together with FIG. 2, which was discussed earlier.

The operation-mode-setting routine in this embodiment differs from that illustrated in the flowchart of FIG. 2 in the following points.

Figure 10:
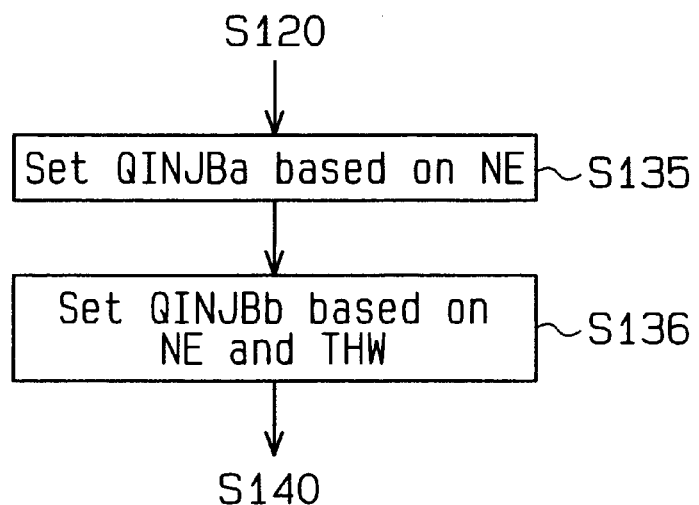
FIG. 10 is a flowchart illustrating an operation-mode-setting routine according to a fourth embodiment.

When the basic injection amount QINJB is computed on the basis of the engine speed NE and acceleration angle ACCP (step S120 in FIG. 2), first, the first decision value QINJBa is set based on the engine speed NE as shown in FIG. 10 (step S135). Next, the second decision value QINJBb is set based on the engine speed NE and the coolant temperature THW (step S136).

Stored in the storage section 84 are operation data that define the relationship among the engine speed NE, the coolant temperature THW and the second decision value QINJBb and operation data that define the relationship between the engine speed NE and the first decision value QINJBa. The individual decision values QINJBa and QINJBb are set based on the operation data.

Figure 11:
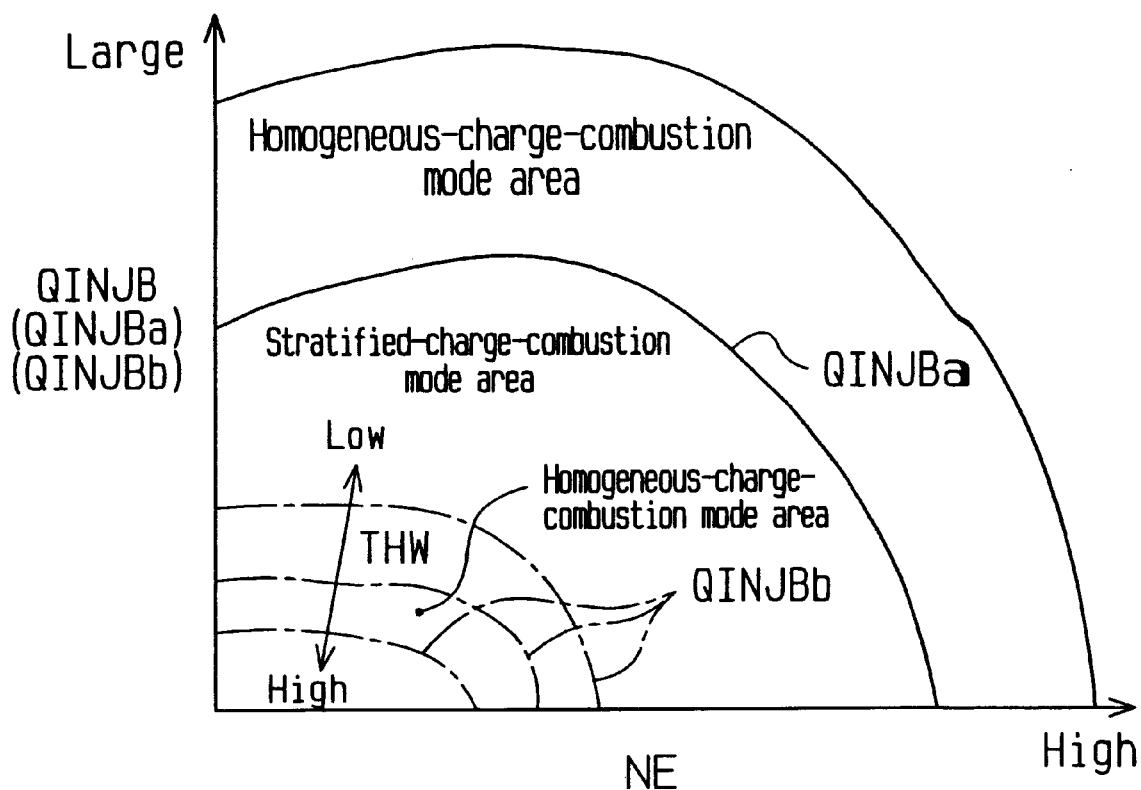
FIG. 11 is a map showing operation data to be used in setting first and second decision values.

FIG. 11 shows the operation data as a map. As shown in this diagram, when the engine speed NE is constant, the second decision value QINJBb decreases as the coolant temperature THW increases.

When the individual decision values QINJBa and QINJBb are set, the decision values QINJBa and QINJBb are compared with the basic injection amount QINJB, and the operation mode is set to either the stratified mode or the homogeneous mode based on the result (steps S140 to S180 in FIG. 2).

According to the combustion control of this embodiment, as discussed above, the second decision value QINJBb decreases as the coolant temperature THW increases. Therefore, the second decision value QINJBb is more accurate and more effective for deciding whether or not the air-conditioning system 50 can deliver an adequate amount of heat.

The heating performance of the air-conditioning system 50 varies according to the current engine load, or the amount of heat that is currently being transferred to the engine coolant from the combustion gas, in addition to the amount of heat that has been transferred to the engine coolant from the combustion gas earlier. Even when the engine load is low and the amount of heat that is currently being transferred to the engine coolant is small, for example, it is possible that the heating performance of the air-conditioning system 50 is adequate if the amount of heat that was transferred to the engine coolant earlier sufficiently increased the coolant temperature THW. Even when the engine load is high and the amount of heat that is currently being transferred to the engine coolant is large, on the other hand, the heating performance of the air-conditioning system 50 may be inadequate if little heat has been transmitted to the engine coolant and the coolant temperature THW is very low.

By setting the second decision value QINJBb based on the coolant temperature THW, therefore, a change in the heating performance of the air-conditioning system 50 in accordance with a change in coolant temperature THW is recognized.

As apparent from the above, this embodiment has the following advantage in addition to the advantages (1) to (3) of the first embodiment.

(7) Because it is possible to accurately determine whether the air-conditioning system 50 is delivering an adequate amount of heat, it is possible to effectively guarantee adequate heat delivery by the air-conditioning system 50 while limiting fuel consumption.

Fifth Embodiment

The description of the fifth embodiment will focus mainly on the differences from the second embodiment. Although the closing amount DTA of the throttle angle TA is based only on the basic injection amount QINJB and the engine speed NE in the second embodiment, the closing amount DTA is set based on the coolant temperature THW, the basic injection amount QINJB, and the engine speed NE in this embodiment.

The details of the combustion control of this embodiment will now be described referring to FIGS. 12 through 14 together with FIG. 6, which was discussed above.

The procedure of setting various control values in this embodiment differ from those of the second embodiment of FIG. 6 in the following points.

Figure 12:
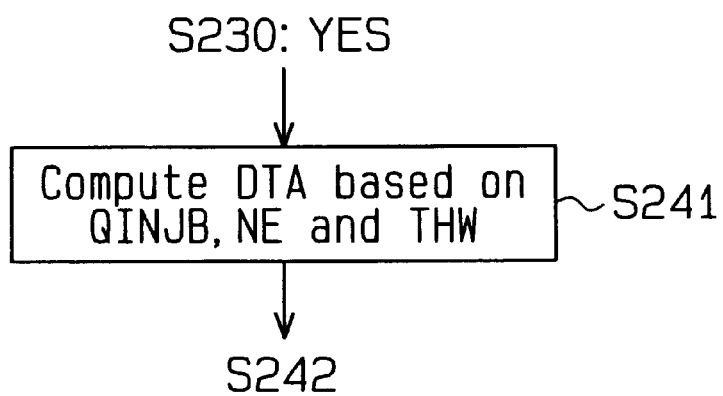
FIG. 12 is a flowchart illustrating procedures of setting various control values of an engine according to a fifth embodiment.

When it is determined that the semi-stratified mode has been selected (YES in step S230 in FIG. 6), the closing amount DTA is computed on the basis of the basic injection amount QINJB, the engine speed NE, and the coolant temperature THW as shown in FIG. 12 (step S241).

The coolant temperature THW is used to estimate the heating performance of the air-conditioning system 50. The lower the coolant temperature THW, the lower the estimated heating performance of the air-conditioning system 50.

Stored in the storage section 84 is operation data that defines the relationship among the basic injection amount QINJB, the engine speed NE, the coolant temperature THW, and the closing amount DTA. The closing amount DTA is computed based on this operation data.

Figure 13:
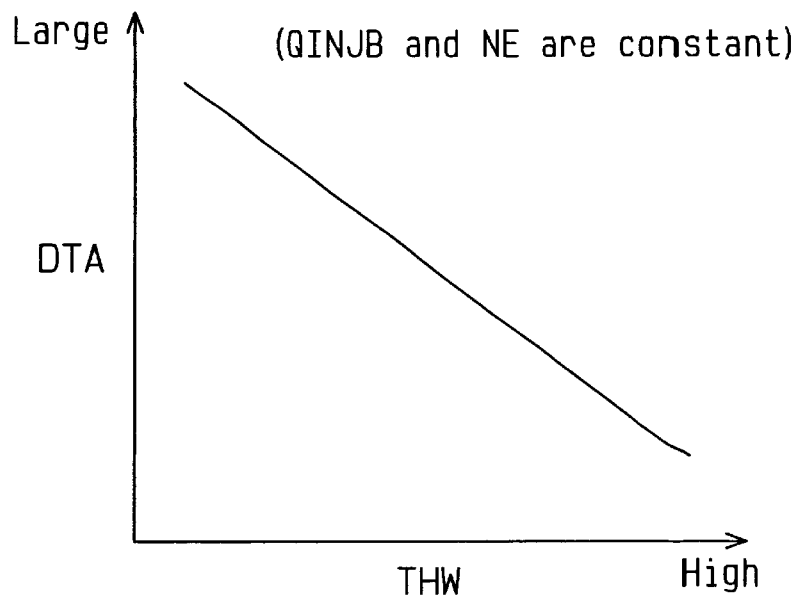
FIG. 13 is a map showing the relationship between the coolant temperature and the throttle position.

FIG. 13 is a graph showing the relationship between the coolant temperature THW and the closing amount DTA when both the basic injection amount QINJB and engine speed NE are constant. As shown in the diagram, as the coolant temperature THW decreases, i.e., as the estimated heating performance of the air-conditioning system 50 decreases, the closing amount DTA computed increases.

Figure 6:
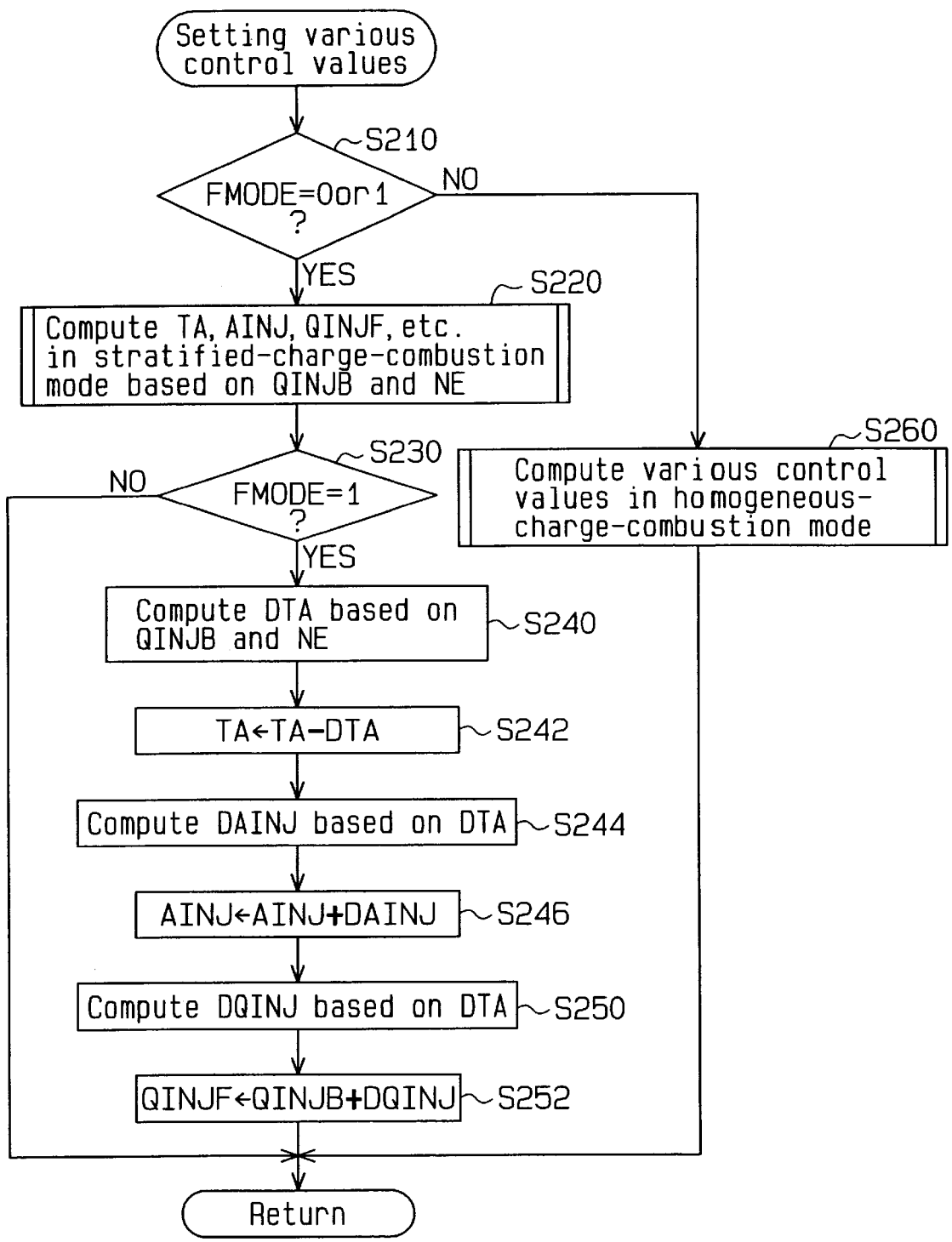
FIG. 6 is a flowchart illustrating procedures of setting various control values of an engine according to the second embodiment.

When the closing amount DTA is calculated this way, the throttle angle TA is corrected based on the closing amount DTA, and the fuel injection timing AINJ and the final fuel injection amount QINJF are computed to suit the semi-stratified mode also, based on the closing amount DTA (steps S242–S252 in FIG. 6).

According to the combustion control of this embodiment, when the operation mode is set to the semi-stratified mode as a result of the decision that heating performance of the air-conditioning system 50 is inadequate, the closing amount DTA of the throttle angle TA in the semi-stratified mode is increased as the estimated heating performance of the air-conditioning system 50 decreases.

As the closing amount DTA increases, the fuel injection timing AINJ is advanced more, and the final fuel injection amount QINJF is increased. The lower the estimated heating performance of the air-conditioning system 50 is, therefore, the greater the reduction in the stratification in the semi-stratified mode becomes.

Figure 14:
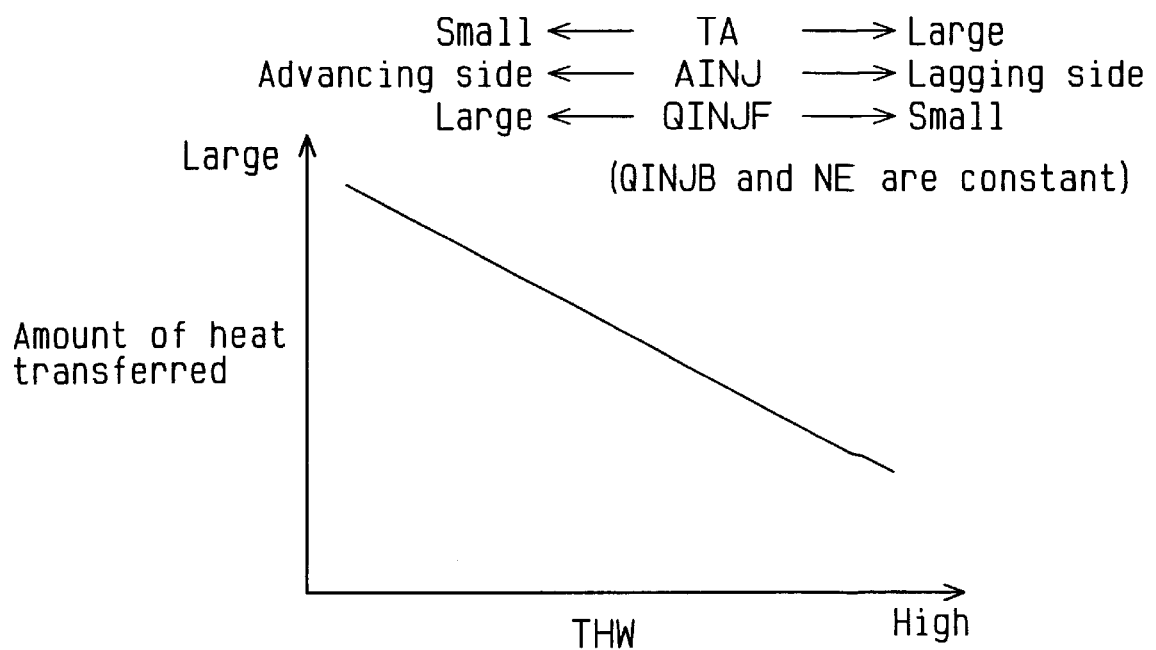
FIG. 14 is a map showing the relationship between the coolant temperature and the amount of heat per unit time transferred to the engine coolant from the combustion gas.

When the coolant temperature THW is low, and it is determined that the heating performance of the air-conditioning system 50 is low, the degree of reduction in the engine heat efficiency increases, and the amount of heat transferred to the engine coolant per unit time increases, as shown in FIG. 14. Consequently, the temperature of the engine coolant rises more quickly and the heating performance of the air-conditioning system 50 is quickly improved. When the coolant temperature THW is high from which it is determined that the heating performance of the air-conditioning system 50 is high, on the other hand, the degree of reduction in the engine heat efficiency is limited. This results in less heat being transferred to the engine coolant and thus limits fuel consumption.

As apparent from the above, this embodiment has the following advantages in addition to the advantages (1) and (3) of the first embodiment and the advantage (4) of the second embodiment.

(8) Because the stratification in the semi-stratified mode is appropriately set in accordance with the heating performance of the air-conditioning system 50, inadequate heating by the air-conditioning system 50 is prevented while fuel consumption is limited.

(9) Since the heating performance of the air-conditioning system 50 is estimated based on the coolant temperature THW, which has a high correlation with the heating performance, the heating performance is accurately estimated.

Sixth Embodiment

The description of the sixth embodiment will focus mainly on the differences from the first embodiment. According to this embodiment, the basic injection amount QINJB is compared with the individual decision values QINJBa and QINJBb, it is determined whether the temperature of the warm air that has passed the heater core 51 (the temperature of the air immediately after passing the heater core 51 at a predetermined flow rate) is higher than a predetermined temperature, which guarantees adequate heat delivery by the air-conditioning system 50, and the operation mode is set based on the results of those decisions.

The details of the above combustion control in this embodiment will now be described referring to FIG. 15.

Figure 15:
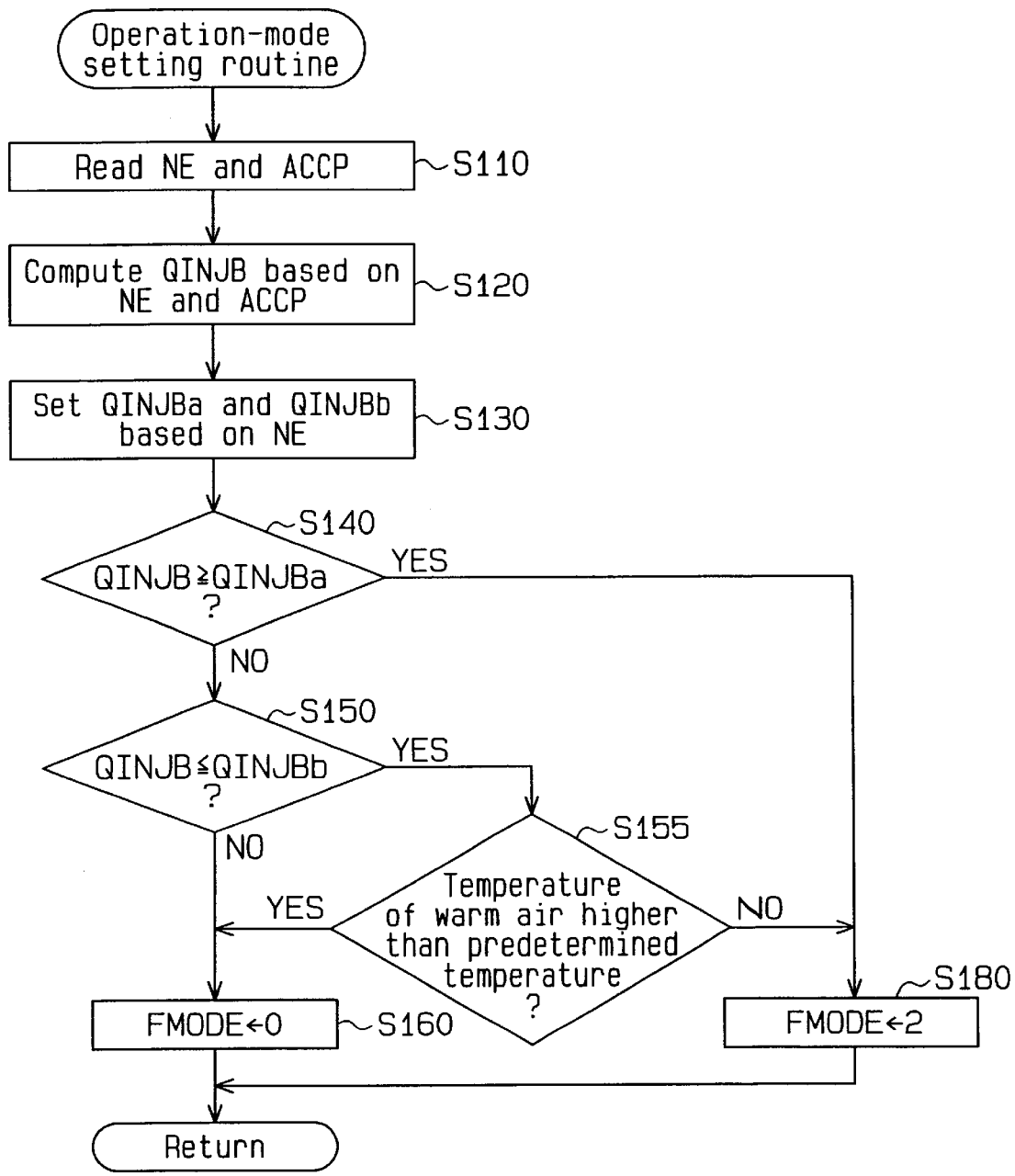
FIG. 15 is a flowchart illustrating an operation-mode-setting routine according to a sixth embodiment.

FIG. 15 is a flowchart illustrating the procedures of an operation-mode-setting routine according to this embodiment. The steps in the flowchart of FIG. 15 that have the same reference numerals as corresponding steps of the flowchart in FIG. 2 have been discussed earlier and will not be discussed again here.

In implementing this operation-mode-setting routine, the basic injection amount QINJB is compared with the individual decision values QINJBa and QINJBb (steps S140 and S150). When it is determined that the basic injection amount QINJB is equal to or less than the second decision value QINJBb (YES in step S150), it is then determined whether the temperature of the warm air that has passed the heater core 51 is higher than a predetermined temperature (e.g., 50° C.) (step S155).

This decision is performed in the following sequence. First, it is determined whether the air-conditioning system 50 is drawing in outside air or inside air based on the position of the inside/outside air select switch 77. When the air-conditioning system 50 is drawing in air from outside, the temperature of the warm air is estimated based on the coolant temperature THW and the outside-air temperature THA and it is then determined whether the estimated temperature is higher than the predetermined temperature. When the air-conditioning system 50 is drawing in air from inside the passenger compartment 92, the temperature of the warm air is estimated based on the coolant temperature THW and the compartment temperature THC of the passenger compartment 92, and it is then determined whether the estimated temperature is higher than the predetermined temperature.

The temperature of the warm air can be estimated using the following equations, for example.

When outside air is drawn in $$THE = THA + K1(THW - THA) + K2 \tag{7}$$

(When inside air is fed in)

$$THE = THC + K1(THW - THC) + K2 \tag{8}$$

where THE is the temperature of the warm air, and K1 and K2 are constants.

In the above decision, the coolant temperature THW correlates with the amount of heat transferred to the air from the heater core 51, and the outside-air temperature THA and the compartment temperature THC correlate with the initial temperature of the air before it is heated by the heater core 51.

When it is determined that the temperature of the warm air is equal to or lower than the predetermined temperature (NO in step S155), the operation mode is set to the homogeneous mode (FMODE=2) (step S180). In this case, therefore, the temperature of the engine coolant is increased so that the heating performance of the air-conditioning system 50 is quickly improved.

When it is determined that the temperature of the warm air is higher than the predetermined temperature (YES in step S155), the operation mode is set to the stratified mode (FMODE=0) (step S160). In this case, therefore, fuel consumption is reduced.

According to the combustion control of this embodiment, as apparent from the above, when it is determined that the basic injection amount QINJB is equal to or smaller than the second decision value QINJBb, it is then determined whether the temperature of the warm air is higher than the predetermined temperature. The operation mode is set to the homogeneous mode only when it is determined that the temperature of the warm air is higher than the predetermined temperature.

This prevents the operation mode from being set to the homogeneous mode when the temperature of the warm air that has passed the heater core 51 is high enough to provide adequate heating performance by the air-conditioning system 50. Therefore, an unnecessary reduction in combustion efficiency is avoided.

As apparent from the above, therefore, this embodiment has the following advantages in addition to the advantages (1) to (3) of the first embodiment.

(10) Because it is more accurately determined, based on the temperature of the warm air that has passed the heater core 51, whether or not the air-conditioning system 50 can deliver enough heat, the fuel consumption is reduced as much as possible by preventing an unnecessary reduction in combustion efficiency.

(11) The temperature of the warm air that has passed the heater core 51 is determined by referring to the amount of heat transferred from the engine coolant and the initial temperature of the air before being heated. Therefore, the decision is more reliable, since it is based on better information.

Seventh Embodiment

The description of the seventh embodiment will focus mainly on the differences from the first embodiment. According to this embodiment, the basic injection amount QINJB is compared with the individual decision values QINJBa and QINJBb, the set position of the temperature setting switch 76 is determined, and the operation mode is set based on the results of those decisions.

The details of the above combustion control of this embodiment will now be described referring to FIG. 16.

FIG. 16 is a flowchart illustrating the an operation-mode-setting routine according to this embodiment. The steps in the flowchart in FIG. 16 that have the same reference numerals as corresponding steps of the flowchart in FIG. 2 have been discussed earlier, they will not be discussed again here.

In implementing this operation-mode-setting routine, the basic injection amount QINJB is compared with the individual decision values QINJBa and QINJBb (steps S140 and S150). When it is determined that the basic injection amount QINJB is equal to or less than the second decision value QINJBb, it is then determined whether the temperature setting switch 76 is set to the lowest-temperature (lowest-temperature position) (step S157).

When it is determined that the temperature setting switch 76 is not set to the lowest-temperature position (NO in step S157), the operation mode is set to the homogeneous mode (FMODE=2) (step S180). In this case, therefore, increasing the temperature of the engine coolant is hastened to quickly improve the heating performance of the air-conditioning system 50.

When it is determined that the temperature setting switch 76 is set to the lowest-temperature position (YES in step S157), there is no need to raise the temperature inside the passenger compartment 92 by the air-conditioning system 50, and it is unnecessary to increase the temperature of the engine coolant. As a result, the operation mode is set to the stratified mode (FMODE=0) (step S160). In this case, therefore, fuel consumption is reduced.

According to the combustion control of this embodiment, as discussed above, whether or not there is a need for the air-conditioning system 50 to increase the temperature is determined on the basis of the position of the temperature setting switch 76. If it is determined that there is no such demand, setting the operation mode to the homogeneous mode is prohibited and the operation mode is set to the stratified mode when the engine load (basic injection amount QINJB) is equal to or smaller than the decision value (second decision value QINJBb).

This prevents the operation mode from being changed to the homogeneous mode to increase the heating performance when it is unnecessary. Therefore, an unnecessary reduction in the combustion efficiency is avoided, which improves the fuel efficiency.

As apparent from the above, therefore, this embodiment has the following advantage in addition to the advantages (1) to (3) of the first embodiment.

(12) The fuel efficiency is further improved.

Other Embodiments

The structures of the above-described embodiments can be modified as follows.

In the first embodiment, when it is determined that the basic injection amount QINJB is equal to or smaller than the second decision value QINJBb so that the operation mode is set to the homogeneous mode, the heating performance of the air-conditioning system 50 may be estimated. As this estimated heating performance decreases, the ignition timing in the homogeneous combustion may be retarded.

With this structure, when the heating performance of the air-conditioning system 50 is low, retarding the ignition timing decreases the combustion efficiency so that more fuel is needed to produce the same engine power. This further increases the cooling loss. Therefore, the degree of reduction in the engine heat efficiency increases, which increases the temperature of the engine coolant. This quickly improves the heating performance of the air-conditioning system 50. When the heating performance of the air-conditioning system 50 is high, on the other hand, advancing the ignition timing reduces the cooling loss. This prevents a reduction in the combustion efficiency and thus limits fuel consumption.

The degree of reduction in the engine heat efficiency is therefore set in accordance with the heating performance of the air-conditioning system 50. This prevents the occurrence of inadequate heating performance while limiting fuel consumption.

The heating performance of the air-conditioning system 50 may be estimated by using any of the following schemes discussed in the foregoing section of the fifth embodiment:

(a1) It is assumed that the lower the coolant temperature THW is, the lower the heating performance is.

(a2) It is assumed that the lower the engine load (e.g., the basic injection amount QINJB) is, the lower the heating performance is.

(a3) Referring to at least one of the passenger compartment temperature THC and the outside-air temperature THA, it is assumed that the lower such temperature is, the lower the heating performance is.

In the fifth embodiment, the heating performance of the air-conditioning system 50 may be estimated by using the estimation scheme (a2) or (a3). If the estimation scheme (a2) is used, particularly, the closing amount DTA of the throttle angle TA is increased as the engine load (basic injection amount QINJB) decreases. The closing amount DTA is thus relatively smaller when switching from the stratified mode to the semi-stratified mode. This can limits a rapid change in engine's combustion state when switching the operation mode, thus preventing a transient variation in engine power.

In the fifth embodiment, the operation mode is set to the homogeneous mode or the semi-stratified mode when the basic injection amount QINJB is equal to or less than the second decision value QINJBb or the third decision value QINJBc. The operation mode may be set to the homogeneous mode or the semi-stratified mode when at least one of the coolant temperature THW, the outside-air temperature THA and the compartment temperature THC is equal to or lower than a predetermined threshold temperature.

In the fifth embodiment, the second decision value QINJBb or the third decision value QINJBc may decrease as one of the coolant temperature THW, the outside-air temperature THA and the compartment temperature THC increases.

In the third embodiment, when the basic injection amount QINJB, on the engine load, is equal to or less than the third decision value QINJBc, the basic injection amount QINJB is compared with the second decision value QINJBb, and the operation mode is switched to the semi-stratified mode or the homogeneous mode based on the comparison result. This switching of the operation mode may be based on parameters that correlate with the heating performance of the air-conditioning system 50, such as the coolant temperature THW, the outside-air temperature THA and the compartment temperature THC.

In this case, at least one of the coolant temperature THW, the outside-air temperature THA and the compartment temperature THC is a reference temperature, and the operation mode is set to the homogeneous mode when the reference temperature is equal to or lower than a predetermined threshold temperature, and the mode is set to the semi-stratified mode when the reference temperature is higher than the predetermined threshold temperature.

In the first to seventh embodiments, the structure may be such that the second decision value QINJBb or the third decision value QINJBc is variable based on the position of the temperature setting switch 76. In this case, for example, the higher the temperature setting of the temperature setting switch 76 is, the greater the second decision value QINJBb or the third decision value QINJBc is.

In the first to fifth embodiments, when it is determined that the air-conditioning system 50 cannot deliver an adequate amount of heat, the operation mode is switched to the homogeneous mode or the semi-stratified mode upon making the decision. The operation mode may be switched only if the determined state continues over a predetermined period of time. This would limit deterioration of the engine's combustion state caused by frequent switching of the operation mode.

In the sixth embodiment, the coolant temperature THW, the outside-air temperature THA and the passenger compartment temperature THC are referred to when estimating the temperature of the warm air that has passed the heater core 51. The temperature of that warm air may however be estimated based on only one of those temperatures THW, THA and THC.

In the fifth embodiment, the stratification in the semi-stratified mode or the retardation of the ignition timing in the homogeneous mode may vary based on the estimated temperature of the warm air that has passed the heater core 51. In this case, as the estimated temperature decreases, the stratification is decreased or the retardation of the ignition timing is increased. When estimating the temperature of the arm air, any of the estimation schemes discussed with regard o the sixth embodiment can be used.

In the fifth embodiment, when it is determined that the air-conditioning system 50 cannot deliver enough heat, the stratification may be reduced by lowering the strength of the swirl current by adjusting, for example, the swirl angle.

In the seventh embodiment, the operation mode is prevented from being set to the homogeneous mode when the temperature setting switch 76 is set to the lowest-temperature position. This process may also be employed in the second to sixth embodiments so that the operation mode is prevented from being set to the homogeneous mode or the semi-stratified mode.

Although the air-conditioning system 50 in the above-described individual embodiments has been described as providing both heating and cooling, the air-conditioning system 50 may be of a type that only delivers heat.

The present examples and embodiments are to be considered as illustrative and not restrictive and the invention is not to be limited to the details given herein, but may be modified within the scope and equivalence of the appended claims.

What is claimed is:

1. An apparatus for controlling an engine used in a vehicle, wherein the vehicle has a heater that uses engine coolant as a heating source, and wherein the engine operates in a stratified-charge-combustion mode, in which a mixture of air and fuel is non-uniformly injected into a combustion chamber, the apparatus comprising:

determination means for determining whether the heating performance of the heater is insufficient; and a controller, wherein, when the heating performance of the heater is determined to be insufficient, the controller controls the engine such that the engine heat efficiency falls below that of the stratified-charge-combustion mode.

2. The apparatus according to claim 1, wherein the engine operates in a combustion mode selected from a plurality of combustion modes, the combustion modes including the stratified-charge-combustion mode and a homogeneous-charge-combustion mode, in which the mixture is distributed in a homogeneous manner in the combustion chamber, wherein, when the heating performance of the heater is determined to be insufficient, the controller controls the engine to operate in the homogeneous-charge-combustion mode.

3. The apparatus according to claim 1, wherein the engine operates in a combustion mode selected from a plurality of combustion modes, the combustion modes including the stratified-charge-combustion mode and a semi-stratified-charge-combustion mode, in which there is less stratification than in the stratified-charge-combustion mode, wherein, when the heating performance of the heater is determined to be insufficient, the controller controls the engine to operate in the semi-homogeneous-charge-combustion mode.

4. The apparatus according to claim 1, wherein the controller lowers the engine heat efficiency by a greater degree as the insufficiency of the heating performance of the heater increases.

5. The apparatus according to claim 4, wherein the engine operates in a combustion mode selected from a plurality of combustion modes, the combustion modes including the stratified-charge-combustion mode and a semi-stratified-charge-combustion mode, in which there is less stratification than in the stratified-charge-combustion mode, wherein, when the heating performance of the heater is determined to be insufficient, the controller controls the engine to operate in the semi-homogeneous-charge-combustion mode, and wherein the controller decreases the stratification as the insufficiency of the heating performance of the heater increases.

6. The apparatus according to claim 4, wherein the engine operates a combustion mode selected from a plurality of combustion modes, the combustion modes including the stratified-charge-combustion mode and a homogeneous-charge-combustion mode, in which the mixture is distributed in a homogeneous manner in the combustion chamber, wherein, when the heating performance of the heater is determined to be insufficient, the controller controls the engine to operate in the homogeneous-charge-combustion mode, and wherein the controller retards the ignition timing as the insufficiency of the heating performance of the heater increases.

7. The apparatus according to claim 4, wherein the controller estimates that the insufficiency of the heating performance of the heater increases as the load of the engine decreases.

8. The apparatus according to claim 4, wherein the controller estimates that the insufficiency of the heating performance of the heater increases as at least one of the compartment temperature, the outside-air temperature and the coolant temperature decreases.

9. The apparatus according to claim 1, wherein the determination means determines that the heating performance of the heater is insufficient based on the load of the engine.

10. The apparatus according to claim 9, wherein the determination means determines that the heating performance of the heater is insufficient when the load of the engine is no greater than a predetermined determination value, and wherein the determination means decreases the determination value as at least one of the compartment temperature, the outside-air temperature and the coolant temperature increases.

11. The apparatus according to claim 1, wherein the controller does not lower the engine heat efficiency unless the controller receives a demand to increase the compartment temperature.

12. A method for controlling an engine used in a vehicle, wherein the vehicle has a heater that uses engine coolant as a heating source, and wherein the engine operates in a stratified-charge-combustion mode, in which a mixture of air and fuel is non-uniformly injected into a combustion chamber, the method comprising:

determining whether the heating performance of the heater is insufficient; and controlling the engine such that the engine heat efficiency falls below that of the stratified-charge-combustion mode when the heating performance of the heater is determined to be insufficient.

13. The method according to claim 12, wherein the step of controlling the engine to lower the engine heat efficiency includes controlling the engine to operate in a homogeneous-charge-combustion mode, in which the mixture is distributed in a homogeneous manner in the combustion chamber.

14. The method according to claim 12, wherein the step of controlling the engine to lower the engine heat efficiency includes controlling the engine to operate in a semi-stratified-charge-combustion mode, in which there is less stratification than in the stratified-charge-combustion mode.

15. The method according to claim 12, wherein the step of controlling the engine to lower the engine heat efficiency includes lowering the engine heat efficiency by a greater degree as the insufficiency of the heating performance of the heater increases.

16. The method according to claim 12, wherein the step of controlling the engine to lower the engine heat efficiency includes:

controlling the engine to operate in a semi-stratified-charge-combustion mode, which produces less stratification than the stratified-charge-combustion mode; and decreasing the stratification as the insufficiency of the heating performance of the heater increases.

17. The method according to claim 12, wherein the step of controlling the engine to lower the engine heat efficiency includes:

controlling the engine to operate in a homogenous-charge-combustion mode, in which the mixture is distributed in a homogeneous manner in the combustion chamber; and retarding the ignition timing as the insufficiency of the heating performance of the heater increases.

\* \* \* \* \*